No. 873,792.
PATENTED DEC. 17, 1907.
A. J. RUDOLPH.
PLUMBER'S TRAP.
APPLICATION FILED FEB. 27, 1907.
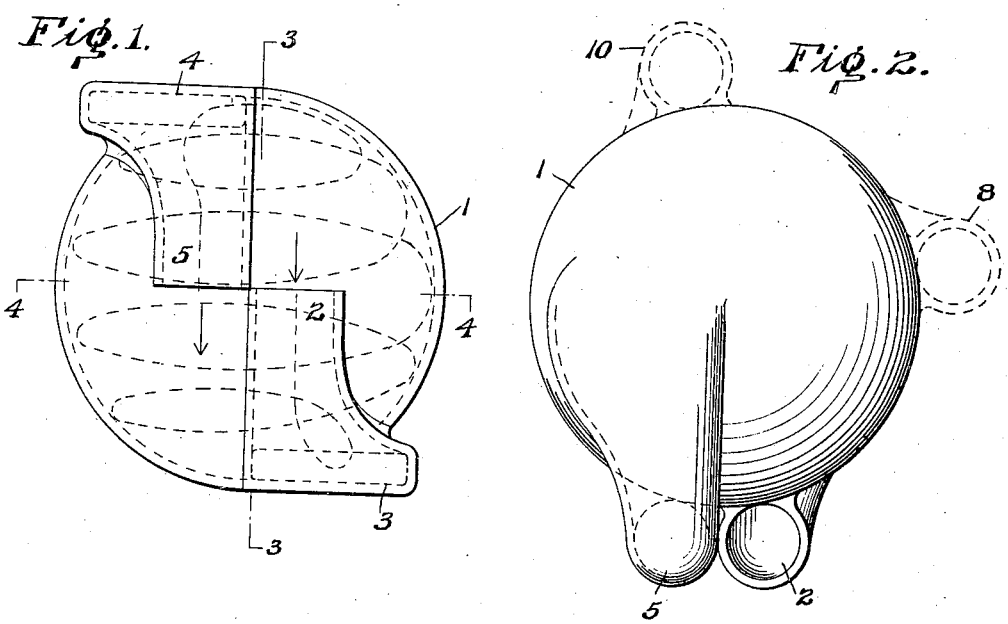
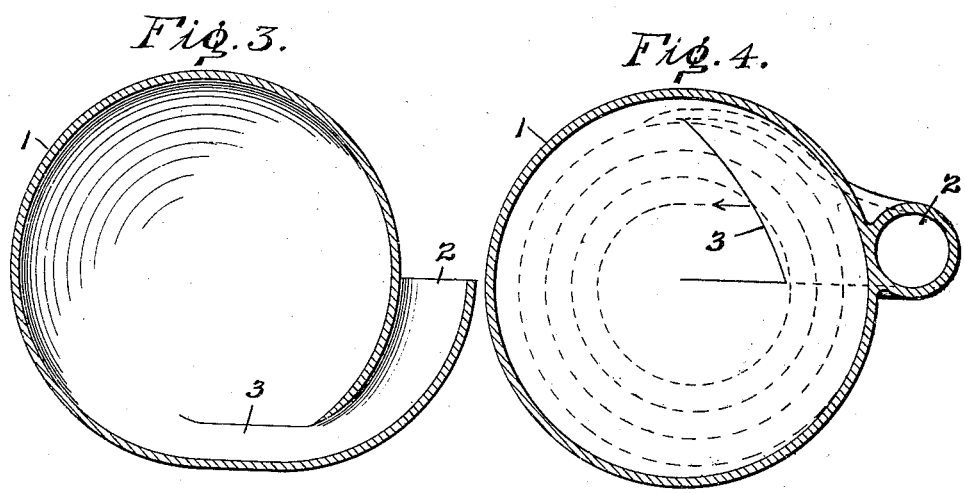
Witnesses
Dan'l. Webster, Jr.
Laura Kleinfelder
Inventor
Alfred J. Rudolph
By Wm C. Strawbridge
Attorney

UNITED STATES PATENT OFFICE.

ALFRED J. RUDOLPH, OF PHILADELPHIA, PENNSYLVANIA.

PLUMBER'S TRAP.

No. 873,792.　　　Specification of Letters Patent.　　　Patented Dec. 17, 1907.

Application filed February 27, 1907. Serial No. 359,596.

*To all whom it may concern:*

Be it known that I, ALFRED J. RUDOLPH, a citizen of the United States, residing at No. 1421 North Twentieth street, in the city of Philadelphia, county of Philadelphia, and State of Pennsylvania, have invented certain new and useful Improvements in Plumbers' Traps, of which the following is a specification.

My invention relates to an improvement in plumbers' traps, and has for its object to provide a trap which is self-cleaning or scouring and which is adapted to contain at all times a sufficient amount of water to create an effective seal to prevent the passage of objectionable gases through the trap.

A convenient form of embodiment of my invention is shown in the accompanying drawing, in which Figure 1 is a side elevation of a trap showing the ingress and egress pipes or inlets;

Figure 2 is a top plan view of a trap;

Figure 3 is a section on the line 3—3 of Figure 1; and

Figure 4 is a section on the line 4—4 of Figure 1.

Referring to the drawings,—

1 designates the body portion or member of a trap, which portion is illustrated as being substantially spherical, though it need not in practice necessarily be so constructed. The trap may be constructed of any suitable material and in any manner desired; for instance, it may be constructed integrally or it may be constructed of two or more pieces or sections secured together. The water from a basin or sink is adapted to enter this member or body portion 1 through a pipe, one end of which is indicated at 2 in the drawings. As indicated in Figures 2 and 4, this pipe is circular in cross-section, but it is widened out at its lower end so that at its point of opening into the member 1 it is of oblong shape or outline, as indicated by dotted lines at 3 in Figure 1 of the drawings.

The exit opening indicated at 4 in Figure 1 and the pipe, a portion of which is indicated by 5, leading from the said exit opening are respectively oblong and circular. In other words, in the construction shown, the ingress and egress openings are exact counterparts of each other and are of a width substantially equal to the radius of the member 1. It is to be understood, however, that the form or shape of these openings may be varied without departing from the scope of my invention.

It will be observed that the water enters the spherical member or trap 1 at a point to one side of a central transverse plane. By reason of the fact that the water enters the spherical member 1, to one side of a central transverse plane therethrough, circular or spiral movement of the water within said member 1 will be occasioned. The direction of movement of the water is indicated by a dotted line and arrows in Figures 1 and 4. The exit opening 4 is so arranged with respect to the direction of movement of the water within the circular trap or member 1 that the direction of the movement of the water is not changed in order to enter such opening. This is of especial advantage by reason of the fact that it is desirable that the full effect of the circularly or spirally moving water in the part 1 shall be applied to scouring and keeping clean the said member. If the exit opening were so placed that it would be necessary for the water to reverse its movement before entering the same, it is apparent that the sediment carried in the water would be permitted to settle upon the sides and upon the bottom portion of the spherical member to the detriment of the efficient action of the same. Preferably the ingress pipe enters and the exit or egress pipe leaves the spherical member 1 tangentially of the portions of the walls of said member adjacent to said points of entry and exit.

In the construction shown in full lines in the drawings, it will be observed that the ingress opening and the egress opening are located upon opposite sides of a central plane extending through the member 1, but, as indicated in dotted lines at 8 and 10, the water may be carried into the member 1 at different points, the only requirement being that it shall enter the member 1 in such manner that it causes a movement of water around the said member in the same direction as is indicated in the arrows and dotted line in Figure 1.

It will also be understood that the position of the egress or exhaust opening may be changed with respect to the member 1, the only restriction or restrictions being that it shall be located at the top of the member 1, and so arranged that the water may enter such opening without its direction of movement being reversed.

By reason of the position of the ingress and egress openings, respectively, at the bottom and the top of the member 1, it will be observed that a maximum depth or seal of water is secured. It will be understood that the trap may, if desired, be provided with a trap screw for the purpose of removing the water from the trap if it should be desired to do so. Such trap screw is not shown, however, for the reason that it has no bearing upon the present invention.

Having thus described my invention, I claim:—

1. A plumber's trap comprising a hollow, spherical body portion or member having an oblong, relatively-thin ingress opening which is parallel with the adjacent wall of the said member, the said opening being located upon one side of a central plane through the said member, and an oblong, relatively-thin egress opening located at the opposite end of a diametrical line drawn from the ingress opening through the said spherical member, and the said egress opening being located upon one side of a plane passed through the center of the said spherical member.

2. A plumber's trap comprising a hollow, spherical body portion or member, the said body portion or member being provided with an oblong ingress opening located at the bottom of the said spherical member and upon one side of a central plane through the said member, the walls of the said opening being substantially parallel with the adjacent portion of the wall of the said member, and the said member being provided with an oblong egress opening located at the top of the said member and upon one side of a central plane through the said member.

3. A plumber's trap comprising a spherical, hollow body portion or member having an oblong, relatively-thin ingress opening which is parallel with the adjacent wall of the said member, the said opening being located at the bottom of the said member upon one side of a central plane through the same, and an oblong, relatively-thin egress opening located at the top of the said member and upon one side of a central plane through the same.

4. A plumber's trap comprising a hollow member, an ingress pipe entering said member tangentially, the opening of which pipe is oblong and of a width substantially equal to the radius of the said member, and an egress pipe, the opening of which is oblong and of a width substantially equal to the radius of the said member.

5. A plumber's trap comprising a hollow, spherical member, an ingress pipe entering said member tangentially, the opening of which pipe is oblong and of a width substantially equal to the radius of the said member, and an egress pipe, the opening of which is oblong and of a width substantially equal to the radius of the said member.

6. A plumber's trap comprising a hollow, spherical member, an ingress pipe entering said member tangentially, the opening of which located upon one side of a central plane through the said member is oblong and of a width substantially equal to the radius of the said member, and an egress pipe, the opening of which located upon one side of a central plane through the said member is oblong and of a width substantially equal to the radius of the said member.

7. A plumber's trap comprising a hollow, spherical member, an ingress pipe entering said member tangentially, the opening of which located upon one side of a central plane through the said member is oblong and of a width substantially equal to the radius of the said member, an egress pipe, the opening of which located upon one side of a central plane through the said member is oblong and of a width substantially equal to the radius of the said member, and extending in the same direction as the movement of the current through the said member.

8. A plumber's trap comprising a spherical member, an ingress pipe entering said spherical member tangentially of the adjacent portion of the wall of said member, and an egress pipe leaving said member tangentially of the adjacent portion of the wall of said member, the said points of entering and leaving being upon opposite sides of the said spherical member.

9. A plumber's trap comprising a spherical member, an ingress pipe entering said spherical member tangentially of the adjacent portion of the wall of said member, and an egress pipe leaving said member tangentially of the adjacent portion of the wall of said member, the entry and exit openings being oblong and their major axes being parallel with the adjacent portions of the walls of said member, and the said points of entering and leaving being upon opposite sides of the said spherical member.

10. A plumber's trap comprising a spherical member, an ingress pipe entering said spherical member at its bottom tangentially of the adjacent portion of the wall of said member, and an egress pipe leaving said member at its top tangentially of the adjacent portion of the wall of said member, whereby a maximum seal is provided with a minimum amount of water.

11. A plumber's trap comprising a water receiving and holding chamber, an ingress pipe entering said chamber at its bottom tangentially of the portion of the bottom which is adjacent to the place of entry of the said pipe, and an egress pipe leaving said chamber at its top tangentially of the portion of the top which is adjacent to the place of exit of the said pipe.

In testimony that I claim the foregoing as my invention, I have hereunto signed my name this 23rd day of February, A. D. 1907.

ALFRED J. RUDOLPH.

In the presence of:
CYRUS N. ANDERSON,
S. E. PATTERSON.